(12) United States Patent
Engerman

(10) Patent No.: US 11,339,833 B2
(45) Date of Patent: May 24, 2022

(54) COMPOUND IDLER GEAR DISCONNECT AND THE DRIVE AXLE MADE THEREWITH

(71) Applicant: DANA AUTOMOTIVE SYSTEMS GROUP, LLC, Maumee, OH (US)

(72) Inventor: Eric M. Engerman, Novi, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 16/965,583

(22) PCT Filed: Jan. 29, 2019

(86) PCT No.: PCT/US2019/015500
§ 371 (c)(1),
(2) Date: Jul. 28, 2020

(87) PCT Pub. No.: WO2019/148148
PCT Pub. Date: Aug. 1, 2019

(65) Prior Publication Data
US 2021/0048075 A1    Feb. 18, 2021

Related U.S. Application Data

(60) Provisional application No. 62/623,104, filed on Jan. 29, 2018.

(51) Int. Cl.
*F16H 45/02*      (2006.01)
*F16D 11/14*      (2006.01)
(Continued)

(52) U.S. Cl.
CPC .............. *F16D 11/14* (2013.01); *B60B 35/16* (2013.01); *F16D 28/00* (2013.01);
(Continued)

(58) Field of Classification Search
CPC ....... F16H 48/08; B60B 35/16; B60B 35/125; B60B 35/1045; F16D 11/14; F16D 28/00;
(Continued)

(56) References Cited

U.S. PATENT DOCUMENTS 4,043,226 A *  8/1977  Buuck ................. B60K 17/046
                                                475/158
4,244,399 A     1/1981  Palau et al.
(Continued)

FOREIGN PATENT DOCUMENTS

WO    2017027594 A1    2/2017
WO    2017125135 A1    7/2017

OTHER PUBLICATIONS

ISA European Patent Office, International Search Report and Written Opinion Issued in Application No. PCT/US2019/015500, May 8, 2019, WIPO, 12 pages.

*Primary Examiner* — Charles A Fox
*Assistant Examiner* — Farhana Pervin
(74) *Attorney, Agent, or Firm* — McCoy Russell LLP

(57) ABSTRACT

An electric drive axle includes an idler shaft having an input gear and an output gear rotatably mounted thereon. The output gear includes a plurality of first clutch teeth formed thereon. A clutch assembly is also disposed on the idler shaft between the input and output gears. The clutch assembly (Continued)

includes a clutch member having a plurality of second clutch teeth formed thereon, wherein the second clutch teeth are selectively engageable with the first clutch teeth of the output gear.

17 Claims, 5 Drawing Sheets

(51) Int. Cl.
    *B60B 35/16*     (2006.01)
    *F16D 28/00*     (2006.01)
    *F16D 11/00*     (2006.01)
    *F16D 23/12*     (2006.01)

(52) U.S. Cl.
    CPC .. *F16D 2011/002* (2013.01); *F16D 2011/008* (2013.01); *F16D 2023/123* (2013.01)

(58) Field of Classification Search
    CPC ......... F16D 2011/002; F16D 2011/008; F16D 2023/123; B60K 2001/001; B60K 2007/0061; B60K 2007/0092; B60K 17/046

See application file for complete search history.

(56) References Cited

U.S. PATENT DOCUMENTS

| | | | |
|---|---|---|---|
| 4,736,809 A | 4/1988 | Kumazawa | |
| 5,105,517 A * | 4/1992 | Barnow | B60K 17/26 180/247 |
| 6,672,180 B2 | 1/2004 | Forsyth | |
| 6,692,405 B2 | 2/2004 | Minowa et al. | |
| 6,695,740 B2 * | 2/2004 | Hibbler | B60K 23/08 180/247 |
| 7,121,164 B2 | 10/2006 | Hanyu et al. | |
| 7,766,779 B2 | 8/2010 | Belmont | |
| 7,785,221 B2 | 8/2010 | Steinwender | |
| 9,033,839 B2 * | 5/2015 | Rossey | B60K 17/02 475/150 |
| 9,169,879 B2 | 10/2015 | Mori et al. | |
| 9,587,726 B2 | 3/2017 | Koshida et al. | |
| 10,330,164 B2 * | 6/2019 | Lindberg | F16D 11/00 |
| 10,569,647 B2 * | 2/2020 | Yamamura | B60K 23/0808 |
| 10,696,158 B2 * | 6/2020 | De Lemos | B60K 17/36 |
| 2017/0349044 A1 | 12/2017 | Cooper | |

* cited by examiner

COMPOUND IDLER GEAR DISCONNECT AND THE DRIVE AXLE MADE THEREWITH

FIELD

The subject matter of the embodiments described herein is directed toward electric axles, and more particularly to a disconnect device for an electric axle.

BACKGROUND

Electric and hybrid-electric vehicles utilize an electric power source in communication with an electric motor to provide drive, or augmented drive, to the vehicle. Electric vehicles have several characteristics superior to conventional internal combustion engine driven vehicles. For example, electric motors produce fewer vibrations than internal combustion engines, and electric motors achieve maximum torque more quickly than internal combustion engines.

A disconnect device for decoupling the electric motor from the vehicle wheels such that the vehicle speed is not limited by the electric motor may be desirable in some applications. In view of the above, there remains a need for an electric drive axle disconnect device that does not require complicated and expensive components. Further, there remains a need for an electric drive axle having a disconnect device that remains compact in size and weight.

It would be desirable to produce a disconnect device for an electric axle to which cost, complexity, size and weight are minimized.

SUMMARY

In concordance and agreement with the present disclosure, a disconnect device for an electric axle to which cost, complexity, size and weight are minimized, has surprisingly been discovered.

In an embodiment, an electric drive axle, comprises: a first shaft having a first gear disposed thereon; a second shaft having a second gear disposed thereon; a third gear rotatably disposed on the second shaft, wherein the third gear includes a plurality of first clutch teeth; and a clutch assembly disposed on the second shaft, wherein the clutch assembly includes a clutch member disposed on the second shaft, wherein the clutch member includes a plurality of second clutch teeth selectively engageable with the first clutch teeth of the third gear.

As aspects of certain embodiments, the clutch member is axially slideable of the second shaft.

As aspects of certain embodiments, the clutch assembly further includes a cam member having the clutch member at least partially disposed therein.

As aspects of certain embodiments, the cam member includes a gear portion formed thereon.

As aspects of certain embodiments, the gear portion of the cam member is selectively positionable by an actuator.

As aspects of certain embodiments, the cam member further includes a aperture formed therein.

As aspects of certain embodiments, the cam member further includes a cam follower at least partially disposed within the aperture.

As aspects of certain embodiments, the cam follower is coupled to a housing of the electric drive axle.

As aspects of certain embodiments, a rotation of the cam member with the cam follower within the aperture causes an engagement of the clutch assembly.

As aspects of certain embodiments, the clutch assembly further includes a sleeve at least partially disposed between the cam member and the clutch member.

As aspects of certain embodiments, the clutch assembly further includes a biasing member at least partially disposed within the clutch member.

As aspects of certain embodiments, the biasing member is configured to cause a disengagement of the clutch assembly.

As aspects of certain embodiments, the electric drive axle further comprises a differential case having a fourth gear coupled thereto.

As aspects of certain embodiments, the fourth gear of the differential case is in meshed engagement with the third gear.

As aspects of certain embodiments, the differential case includes at least one axle shaft at least partially disposed therein, and wherein the at least one axle shaft is co-axially aligned with the first shaft.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

The above, as well as other advantages of the present embodiments, will become readily apparent to those skilled in the art from the following detailed description when considered in the light of the accompanying drawings in which.

DETAILED DESCRIPTION OF THE PREFERRED EMBODIMENTS

Figure 1:
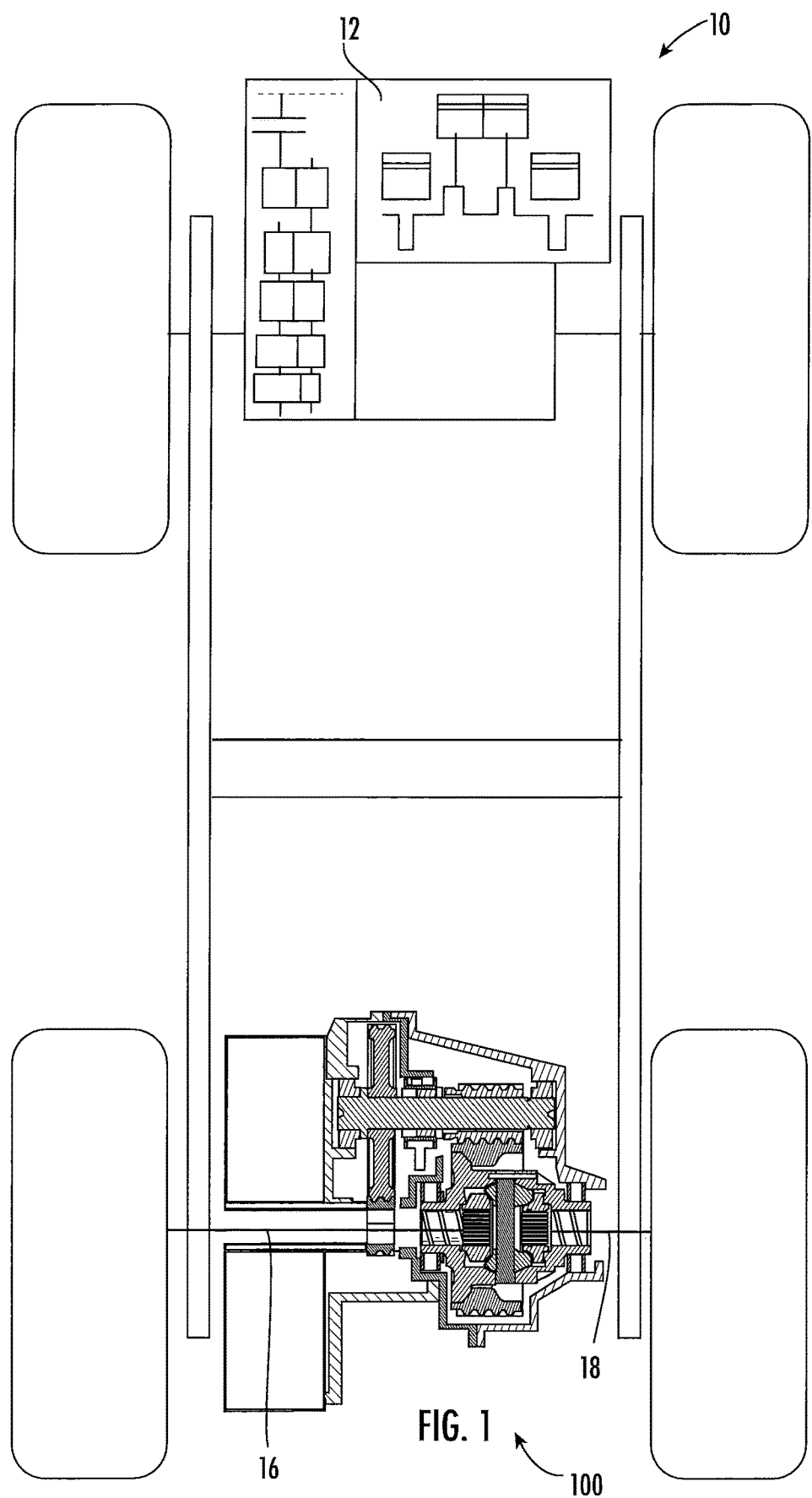
FIG. 1 is a schematic diagram of a vehicle driveline according to an embodiment of the presently disclosed subject matter.

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments of the inventive concepts defined in herein. Hence, specific dimensions, directions or other physical characteristics relating to the embodiments disclosed are not to be considered as limiting.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of an electric drive axle 100 are described below. In certain embodiments, the electric drive axle 100 is utilized with a pure electric vehicle (not depicted) where the electric drive axle 100 is the only driving axle. In other embodiments, as illustrated in FIG. 1, the electric drive axle is utilized with a hybrid four-wheel-drive vehicle 10 where the front axle is driven by an internal combustion engine 12, and the rear axle is the electric drive axle 100 (or vice versa).

In still other embodiments, the electric drive axle 100 is utilized in a hybrid commercial vehicle (not depicted) comprising a tandem axle in which the front tandem axle is driven by an internal combustion engine, and the rear tandem axle is the electric drive axle 100 (or vice versa). The electric drive axle 100 may have applications in commercial vehicles, both light duty and heavy duty vehicles, and for passenger, off-highway, and sport utility vehicles. Additionally, the electric drive axle 100 described herein may be adapted for use in front and/or rear driving axles, and in steerable and non-steerable axles. It would be understood by one of ordinary skill in the art that the electric drive axle 100 also has industrial, locomotive, military, agricultural, and aerospace applications.

Figure 2:
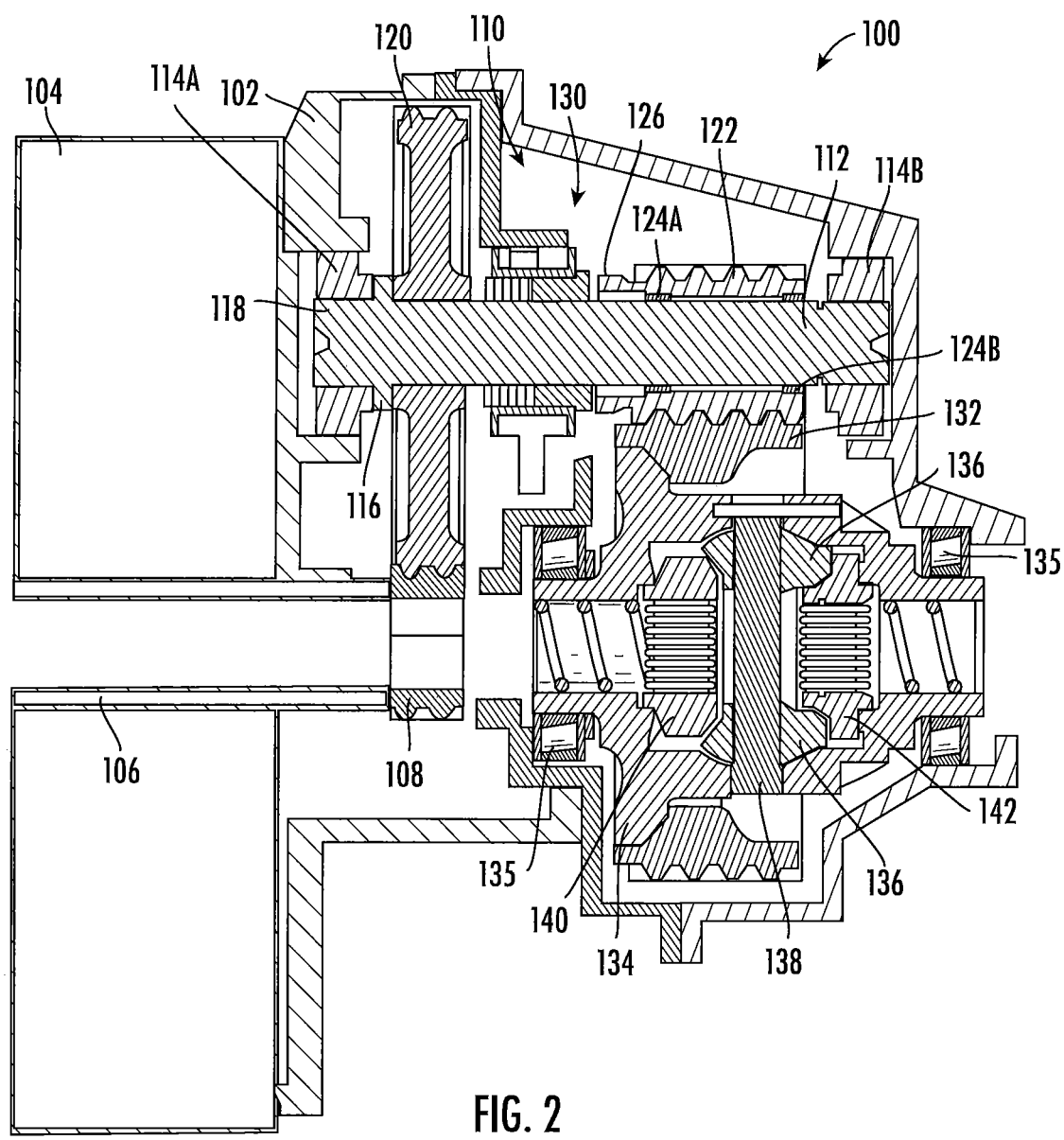
FIG. 2 illustrates a portion of an electric drive axle of the driveline according to FIG. 1.

As illustrated in FIG. 2, in an embodiment, the electric drive axle 100 may comprise an integrated drive system. In an embodiment, the electric drive axle 100 includes an electric motor 104 (e.g., electromotor) coupled with a power source (not depicted). The electric motor 104 may be a permanent magnet synchronous machine comprising a stator disposed concentrically about a rotor. The electric drive axle 100 may additionally comprise an inverter (not depicted) for converting direct current to alternating current when the electric motor 104 is utilized to drive the vehicle, and for converting alternating current to direct current when the vehicle decelerates. The electric motor 104 may be referred to herein as a motor-generator. Further, the electric drive axle 100 may include cooling fluid (not depicted) such as, but not limited to, automatic transmission fluid or axle oil integrated with the electric drive axle 100 lubricant for cooling the electric motor 104 and the inverter. In another embodiment (not depicted), the cooling fluid for the electric motor 104 and the inverter may not be integrated with the axle oil.

A motor output shaft 106 is coupled with the rotor of the electric motor 104 for rotation therewith. A first gear 108 is coupled with the motor output shaft 106. The electric motor 104 drives a compound idler assembly 110 via the motor output shaft 106 and the first gear 108. In an embodiment, as illustrated in FIG. 2, the compound idler assembly 110 is disposed parallel with the motor output shaft 106.

Figure 3:
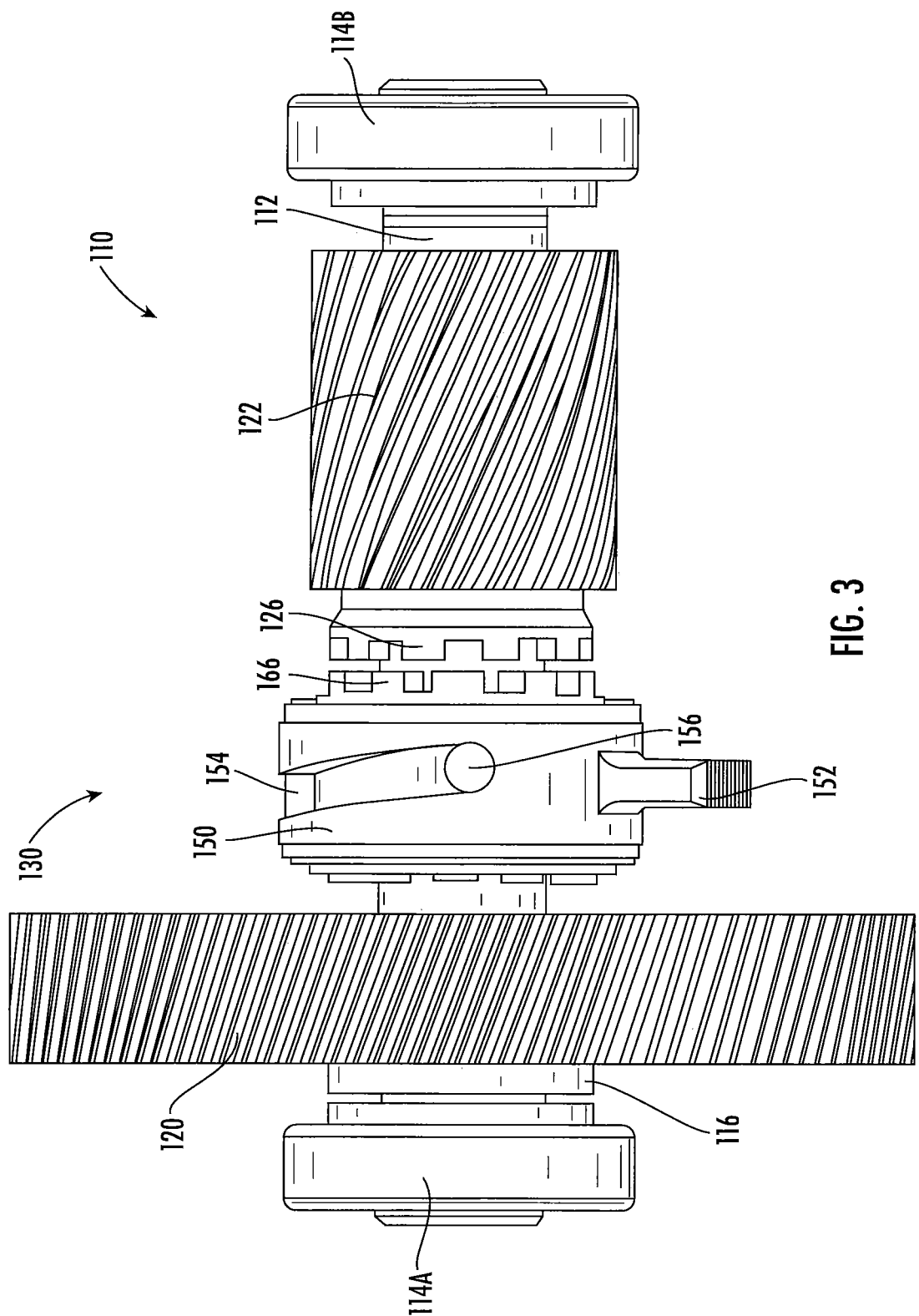
FIG. 3 illustrates a compound idler assembly of the electric drive axle shown in FIG. 2.

As illustrated in FIGS. 2 and 3, the compound idler assembly 110 comprises an idler shaft 112 rotatably supported in an axle housing 102 via first and second bearings 114A, 114B. The idler shaft 112 comprises a radially extending flange 116 adjacent to a first end 118 thereof. The flange 116 abuts the first bearing 114A. A second gear 120 is coupled for rotation with idler shaft 112. The second gear 120 is disposed axially adjacent to the idler shaft flange 116 opposite the first bearing 114A. The second gear 120 is in meshed engagement with the first gear 108 and receives torque therefrom when the electric motor 104 drives the electric drive axle 100.

A third gear 122 is disposed concentrically about the idler shaft 112. The third gear 122 may rotate relative to the idler shaft 112 via first and second needle bearings 124A, 124B disposed radially therebetween. The third gear 122 comprises a plurality of axially extending clutch teeth 126. The clutch teeth 126 integrated with the third gear 122 comprise a portion of a clutch assembly 130 discussed in further detail intra.

The third gear 122 is in meshed engagement with a fourth gear 132. The fourth gear 132 is coupled for rotation with a differential case 134. The differential case 134 is rotatably supported within the axle housing 102 via a pair of bearings 135. Further, the differential case 134 houses two or more differential pinions 136. The differential pinions 136 are coupled with the differential case 134 via a pinion shaft 138 (i.e., spider shaft). In an embodiment, the pinion shaft 138 may comprise a cross member. The differential pinions 136 are in meshed engagement with first and second side gears 140, 142. The first and second side gears 140, 142 are coupled for rotation with first and second half shafts 16, 18, respectively, which are shown in FIG. 1.

Figure 4:
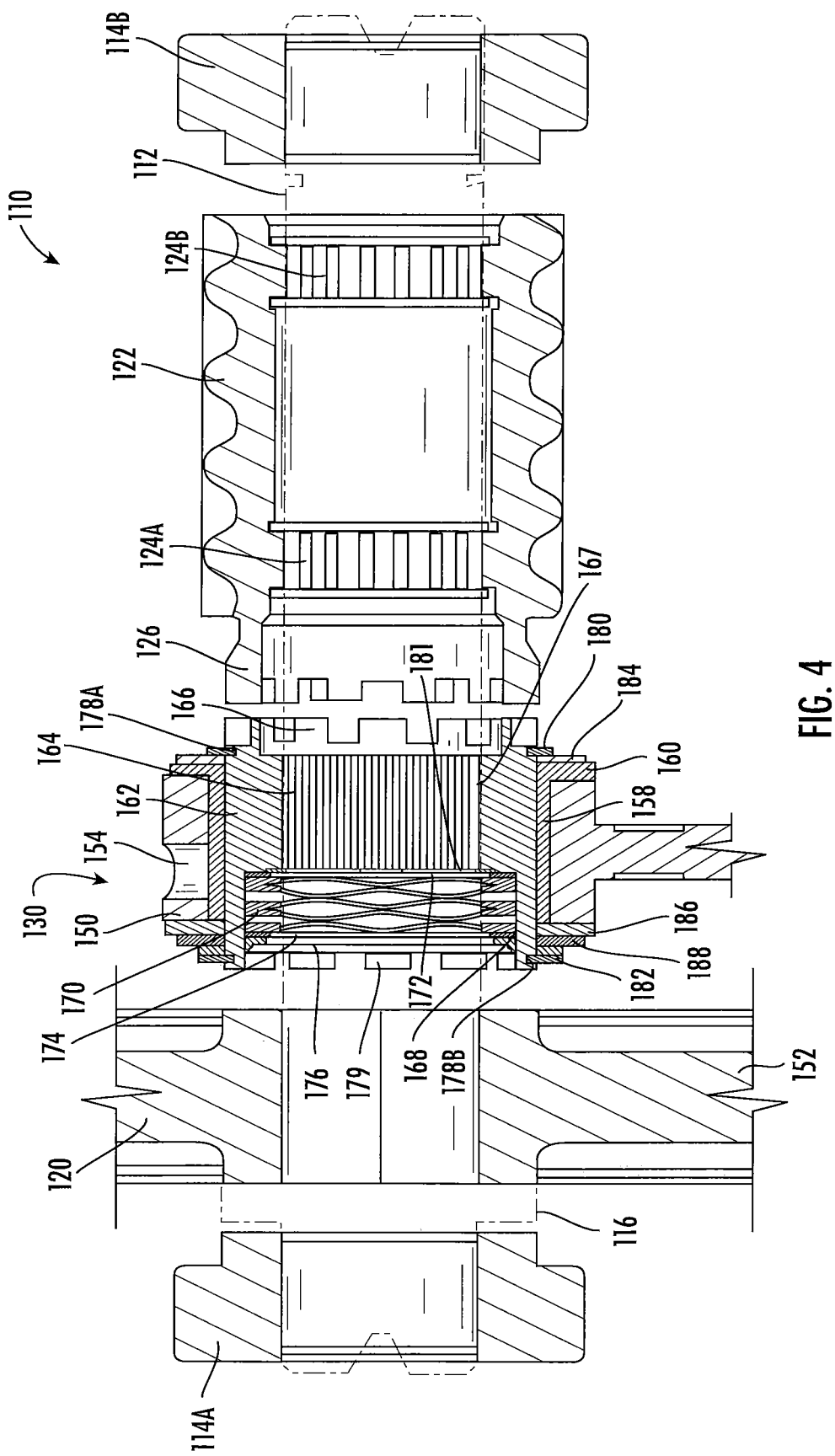
FIG. 4 illustrates a fragmentary cross-sectional view of the compound idler assembly shown in FIG. 3, wherein a idler shaft of the compound idler assembly is shown in phantom lines.

Referring now to FIGS. 3 and 4, the clutch assembly 130 may comprise an actuator (not depicted) such as a motor, for example. In an embodiment, the actuator may be a high-speed low-torque BLDC motor. The actuator may include an output shaft having a pinion gear coupled therewith (not depicted). The pinion gear may be in meshed engagement with a gear portion 152 of a cam member 150. In an embodiment, an idler gear and/or additional gears may be operatively connected between the output shaft pinion gear and the cam member gear portion 152 to obtain a desired speed reduction ratio and/or to enable specific positioning of the actuator.

The cam member gear portion 152 and the output pinion gear maintain constant engagement, while permitting linear actuation of the cam member 150. In the embodiment illustrated in FIGS. 3 and 4, the output pinion gear comprises an axial length sufficient to enable the cam member 150 to travel at least the distance necessary to engage the clutch assembly 130 with the clutch teeth 126 of the third gear 122 while maintaining meshed engagement with the cam member gear portion 152. In another embodiment, the cam member gear portion 152 may comprise an axial length sufficient to enable the cam member 150 to travel at least the distance necessary to engage the clutch assembly 130 with the clutch teeth 126 of the third gear 122 while maintaining meshed engagement with the output pinion gear.

As illustrated in FIG. 3, the cam member 150 includes an elongate aperture 154 disposed at least partially through a radial wall of the cam member 150. In certain embodiments, the elongate aperture 154 forms a slot or ramp portion of the cam member 150. In other embodiments, the aperture 154 may be formed entirely through the radial wall of the cam member 150. It is understood that the aperture 154 can have any shape and size as desired. The axial distance traveled by the cam member 150 may be determined by the aperture 154. A cam follower 156 is at least partially disposed within the aperture 154. The cam follower 156 may comprise a pin that is rotatably coupled, or fixedly coupled, with the axle housing 102. Rotation of the cam member 150 with the cam follower 156 inside the aperture 154 creates linear actuation of the cam member 150.

A sleeve 158 is at least partially concentrically disposed within the cam member 150. In an embodiment, the sleeve 158 may comprise a bushing. The sleeve 158 comprises an annular flange 160 disposed at an end of the sleeve 158 proximate to the third gear clutch teeth 126. A surface of the cam member 150 abuts a surface of the sleeve flange 160. A clutch member 162 is disposed concentrically within the sleeve 158. The clutch member 162 comprises radially inward projecting splines 164 which are in meshed engagement with splines (not depicted) on the idler shaft 112. The clutch member 162 also includes a plurality of clutch teeth 166 disposed at an end thereof proximate the third gear clutch teeth 126.

Figure 5:
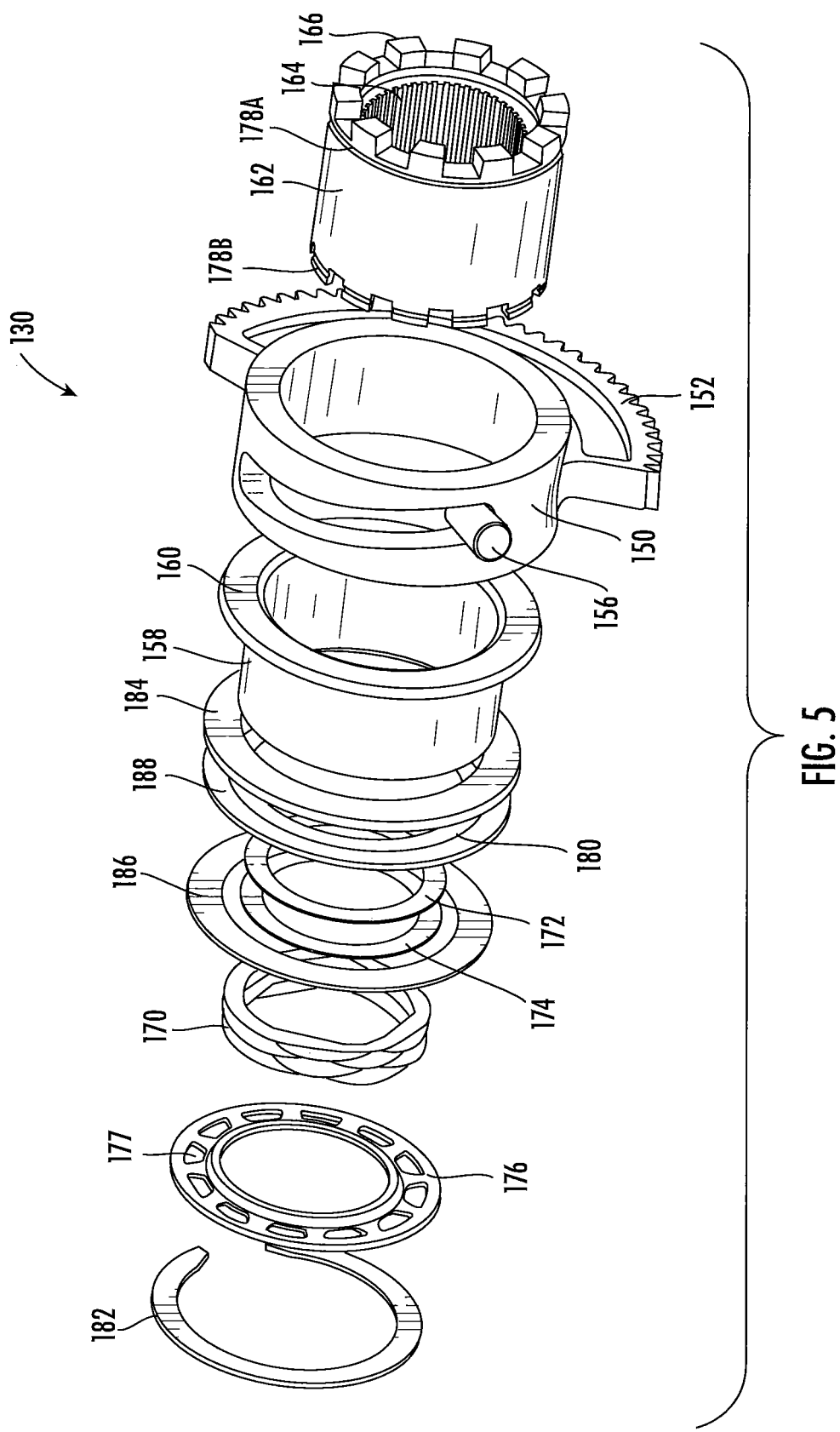
FIG. 5 illustrates an exploded view of a clutch assembly of the compound idler assembly shown in FIG. 3.

In an embodiment, as illustrated in FIG. 4, the clutch member 162 comprises a first radially inner surface 167 and a second radially inner surface 168. The first surface 167 comprises a smaller diameter than the second surface 168. The clutch member splines 164 may be defined by the first surface 167. A biasing member 170 is disposed at least partially concentrically within the clutch member second surface 168. First and second thrust washers 172, 174 are disposed adjacent to each end of the biasing member 170. Additionally, a first retaining ring 176 is disposed concentrically within the clutch member second surface 168 adjacent to the second thrust washer 174. The first retaining ring 176 comprises a plurality of apertures 177 therethrough (see. FIG. 5). The clutch member 162 comprises a plurality of axially protruding tabs 179 that extend through the first retaining ring apertures 177 when the clutch assembly 130 is assembled. A second retaining ring 180 (described intra) maintains the axial position of the first retaining ring 176. The first retaining ring 176 creates a positive stop for the biasing member 170. A snap ring 181 is disposed concentrically within the second surface 168 and is disposed within a groove (not depicted) in the surface of the idler shaft 112. The snap ring 181 is disposed axially between the first thrust washer 172 and a surface defined by the first and second diameters 167,168 of the clutch member 162.

As illustrated in FIG. 4, the cam member 150 and the clutch member 162 are coupled for linear actuation. However, the clutch member 162 may rotate relative to the cam member 150. In an embodiment, the clutch member 162 comprises grooves 178A, 178B in a radially outer surface thereof. The second retaining ring 180 is disposed in the first clutch member groove 178A, and a third retaining ring 182 is disposed in the second clutch member groove 178B. A third thrust washer 184 is disposed axially between the second retaining ring 180 and the sleeve flange 160. The third thrust washer 184 is disposed concentrically about the clutch member 162. A spacer 186 is disposed concentrically about the clutch member 162 and abuts a surface of the cam member 150 and the sleeve 158 distal from the third gear clutch teeth 126. Additionally, a fourth thrust washer 188 is disposed concentrically about the clutch member 162 and axially between the third retaining ring 182 and the spacer 186.

In operation, the electric motor 104 outputs torque to the idler shaft 112 via the meshed engagement of the first and second gears 108, 120. In a first position, the clutch assembly 130 is engaged, and the idler shaft 112 transfers torque to the third gear 122 via the clutch member clutch teeth 166 and the third gear clutch teeth 126. The third gear 122 transfers torque to the differential case 134 via the meshed engagement of the third gear 122 and the fourth gear 132. The differential case 134 transfers torque to the first and second axle shafts 16, 18 via the differential mechanism. When the electric drive axle 100 is in a power generation mode, the torque transfer described above is reversed.

The clutch assembly 130 default state is a second, disengaged, position. The biasing member 170 applies an axial force to the snap ring 181 and to the first retaining ring 176 via the first and second thrust washers 172, 174. The force applied by the biasing member 170 actuates the clutch member 162 away from the third gear clutch teeth 126. In the second position of the clutch assembly 130, the vehicle 10 is driven solely by the internal combustion engine 12.

When the operator desires the vehicle 10 to be driven by the electric drive axle 100, a controller (not depicted) operates to move the clutch assembly into the first, engaged, position. To achieve the first position of the clutch assembly 130, the clutch assembly actuator rotatably drives the cam member 150. Because of the cam follower 156 is disposed in the aperture 154, the cam member 150 actuates axially toward the third gear 122. Actuation of the cam member 150 drives axial translation of the clutch member 162 and compresses the biasing member 170. The clutch member teeth 166 are engaged with the third gear clutch teeth 126.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed:

1. An electric drive axle, comprising:
   a motor output shaft having a first gear disposed thereon;
   a second shaft having a second gear disposed thereon, wherein the second shaft is not co-axially arranged with the motor output shaft and wherein the first gear and the second gear are in meshed engagement;
   a third gear rotatably disposed on the second shaft, wherein the third gear includes a plurality of first clutch teeth; and
   a clutch assembly disposed on the second shaft, the clutch assembly comprising:
      a clutch member comprising a first inner surface and a second inner surface disposed concentrically around the second shaft, splines positioned on the first inner surface, and second clutch teeth selectively engageable with the plurality of first clutch teeth of the third gear;
      a biasing member positioned between the second inner surface of the clutch member and the second shaft, the biasing member urging the second clutch teeth away from the first clutch teeth;
      a first retaining ring positioned within a groove around an outer surface of the clutch member;
      a sleeve positioned concentrically around the outer surface of the clutch member; and
      a cam member positioned concentrically around an outer surface of the sleeve, and rotation of the cam member producing axial movement of the cam member toward the third gear, the axial movement of the cam member is transferred through a flange of the sleeve and the first retaining ring to the clutch member to engage the second clutch teeth with the first clutch teeth.

2. The electric drive axle according to claim 1, wherein the clutch member is axially slideable of the second shaft.

3. The electric drive axle according to claim 1, wherein the cam member includes a gear portion engaged with an output gear of an actuator, and an axial length of the output gear corresponding to a length of travel of the cam member.

4. The electric drive axle according to claim 1, wherein the cam member further includes an aperture formed therein and a cam follower at least partially disposed within the aperture.

5. The electric drive axle according to claim 4, wherein rotation of the cam member with the cam follower within the aperture causes an engagement of the clutch assembly.

6. The electric drive axle according to claim 1, further comprising a differential case having a fourth gear coupled thereto, the differential case configured to transfer torque to at least one axle shaft, and the fourth gear of the differential case in meshed engagement with the third gear.

7. The electric drive axle according to claim 1, wherein the motor output shaft is arranged co-axially with the at least one axle shaft.

8. The electric drive axle of claim 1, wherein a snap ring is positioned concentrically around the second shaft and positioned axially between a radial surface of the clutch member and the biasing member.

9. The electric drive axle of claim 8, wherein a second retaining ring is positioned within the second inner surface of the clutch member and the biasing member presses against the snap ring and the second retaining ring to urge the second clutch teeth away from the first clutch teeth.

10. The electric drive axle of claim 1, wherein the second retaining ring comprises apertures and tabs of the clutch member extend through the apertures of the second retaining ring.

11. An electric drive axle, comprising:
a motor output shaft having a first gear disposed thereon;
a second gear coupled for rotation with an idler shaft, the idler shaft and the motor output shaft are not co-axially aligned, and the first gear is in meshed engagement with the second gear;
a third gear coupled to the idler shaft via at least one bearing, the third gear includes first clutch teeth; and
a clutch assembly disposed on the idler shaft, the clutch assembly comprises:
a clutch member comprising a first inner surface and a second inner surface disposed concentrically around on the idler shaft, splines positioned on the first inner surface, and second clutch teeth selectively engageable with the first clutch teeth of the third gear;
a biasing member positioned between the second inner surface of the clutch member and the idler shaft, the biasing member urging the second clutch teeth away from the first clutch teeth;
a first retaining ring positioned within a groove around an outer surface of the clutch member;
a sleeve positioned concentrically around the outer surface of the clutch member: and
a cam member positioned concentrically around an outer surface of the sleeve, and rotation of the cam member producing axial movement of the cam member toward the third gear, the axial movement of the cam member is transferred through a flange of the sleeve and the first retaining ring to the clutch member to engage the second clutch teeth with the first clutch teeth.

12. The electric drive axle of claim 11, further comprising a differential including a differential case configured to transfer torque to a first axle shaft and a second axle shaft, wherein the differential case includes a fourth gear in meshed engagement with the third gear and wherein the first and second axle shafts are co-axially aligned with the motor output shaft.

13. The electric drive axle of claim 12, wherein the differential case is rotatably supported within an axle housing via one or more bearings.

14. The electric drive axle of claim 13, wherein the idler shaft is rotatably supported within the axle housing via one or more bearings.

15. The electric drive axle of claim 11, wherein a snap ring is positioned concentrically around the idler shaft and positioned axially between a radial surface of the clutch member and the biasing member.

16. The electric drive axle of claim 11, wherein a snap ring and a second retaining are positioned concentrically around the idler shaft, the snap ring positioned between a radial surface of the clutch member and the biasing member, and the biasing member presses against the snap ring and the second retaining ring to urge the second clutch teeth away from the first clutch teeth.

17. The electric drive axle of claim 16, wherein the biasing member extends to push the second clutch teeth away from the first clutch teeth and the biasing member is compressed against the snap ring when the cam member urges the second clutch teeth to engage the first clutch teeth.

* * * * *